(12) United States Patent
Tsai et al.

(10) Patent No.: US 10,926,864 B2
(45) Date of Patent: Feb. 23, 2021

(54) CAMBER ADJUSTMENT SYSTEMS AND METHODS FOR AIRCRAFT WINGS

(71) Applicant: THE BOEING COMPANY, Chicago, IL (US)

(72) Inventors: Kevin R. Tsai, Seattle, WA (US); Bret Alan Bowers, Langley, WA (US)

(73) Assignee: THE BOEING COMPANY, Chicago, IL (US)

( * ) Notice: Subject to any disclaimer, the term of this patent is extended or adjusted under 35 U.S.C. 154(b) by 311 days.

(21) Appl. No.: 16/047,094

(22) Filed: Jul. 27, 2018

(65) Prior Publication Data
US 2020/0031453 A1 Jan. 30, 2020

(51) Int. Cl.
*B64C 9/02* (2006.01)
*B64C 9/12* (2006.01)
*B64C 9/16* (2006.01)

(52) U.S. Cl.
CPC .................. *B64C 9/16* (2013.01); *B64C 9/02* (2013.01); *B64C 9/12* (2013.01)

(58) Field of Classification Search
CPC .. B64C 9/02; B64C 9/12; B64C 13/30; B64C 13/28; B64C 2009/143
See application file for complete search history.

(56) References Cited

U.S. PATENT DOCUMENTS

| | | | |
|---|---|---|---|
| 3,853,289 A * | 12/1974 | Nevermann | B64C 9/16 244/215 |
| 4,702,442 A * | 10/1987 | Weiland | B64C 9/16 244/216 |
| 4,995,575 A * | 2/1991 | Stephenson | B64C 9/16 244/216 |
| 5,161,757 A * | 11/1992 | Large | B64C 9/16 244/213 |
| 9,061,753 B2 | 6/2015 | Beyer | |
| 9,079,652 B2 | 7/2015 | Yue | |
| 9,878,774 B2 | 1/2018 | Tsai | |
| 9,963,220 B2 * | 5/2018 | Ishihara | B64C 9/22 |
| 2007/0176051 A1* | 8/2007 | Good | B64C 9/32 244/215 |
| 2010/0308162 A1* | 12/2010 | Gartelmann | B64C 9/20 244/99.3 |
| 2013/0112814 A1 | 5/2013 | Yue | |
| 2014/0145039 A1* | 5/2014 | Beyer | B64C 9/10 244/215 |
| 2016/0251074 A1* | 9/2016 | Tsai | B64C 9/16 244/215 |
| 2019/0241250 A1* | 8/2019 | Hencke | B64C 9/18 |

OTHER PUBLICATIONS

U.S. Appl. No. 15/957,283, filed Apr. 19, 2018.

* cited by examiner

*Primary Examiner* — Joshua J Michener
*Assistant Examiner* — Arfan Y. Sinaki
(74) *Attorney, Agent, or Firm* — The Small Patent Law Group LLC; Joseph M. Butscher

(57) ABSTRACT

A camber adjustment system for a wing of an aircraft includes a droop panel that is configured to moveably couple to a portion of the wing, a flap, a cam rod moveably coupled to the droop panel, a bell crank cam arm moveably coupled to the flap, and a jackscrew interface between the cam rod and the bell crank cam arm. The droop panel is configured to move in response to movement of the flap via the jackscrew interface.

20 Claims, 15 Drawing Sheets

CAMBER ADJUSTMENT SYSTEMS AND METHODS FOR AIRCRAFT WINGS

FIELD OF THE DISCLOSURE

Examples of the present disclosure generally relate to camber adjustment systems and methods for wings of aircraft.

BACKGROUND OF THE DISCLOSURE

A typical airplane includes wings having control surfaces, such as flaps. For example, a wing includes a flap that is moveably connected to a main body. A moveable droop panel is connected to the flap and the main body.

A droop (or drooping) panel is operable to provide increased camber to a wing as a flap is deployed. The camber of the wing (that is, an airfoil) relates to a curvature of the wing. In general, the camber determines an amount of lift that a wing generates as air flows around the wing. An increased camber generates increased lift. As such, droop panels are typically deployed during take-off and landing of an airplane.

The droop panel typically does not require a high rate of activation, or spoiling (that is, upward motion) capability. Instead, the droop panel generally only needs to downwardly move below a plane of an upper surface of a wing to increase camber of the wing in front of the flap.

One type of droop panel is directly coupled to a dedicated droop actuator, such as a motor, that is used to move the droop panel. As can be appreciated, the droop actuator occupies space within a wing assembly, and adds weight (and cost) to the airplane.

Further, a known droop panel may be connected to a flap through a plurality of pinned connections. However, the plurality of pinned connections may cause deviations in desired positional relationships between the flap and the droop panel. In short, a desired positional relationship may be difficult to control due to the various pinned connections.

SUMMARY OF THE DISCLOSURE

A need exists for a compact and efficient camber adjustment system that occupies a reduced amount of space within a wing. Further, a need exists for a lighter and less complex camber adjustment system. For example, a need exists for a camber adjustment system that is devoid of a dedicated droop actuator, and/or a relatively large number of pinned connections between a droop panel and a flap.

With those needs in mind, certain examples of the present disclosure provide a camber adjustment system for a wing of an aircraft. The camber adjustment system includes a droop panel that is configured to moveably couple to a portion of the wing, a flap, a cam rod moveably coupled to the droop panel, a bell crank cam arm moveably coupled to the flap, and a jackscrew interface between the cam rod and the bell crank cam arm. The droop panel is configured to move in response to movement of the flap via the jackscrew interface.

The camber adjustment system may be devoid of a dedicated droop actuator. In at least one example, a flap actuator is operatively coupled to the flap. The flap actuator is configured to move the flap between a retracted position and a deployed position.

A coupler link that is configured to moveably couple the cam rod to the droop panel. A link arm may moveably couple the bell crank arm to the flap.

In at least one example, the jackscrew interface includes a track on or within one of the cam rod or the bell crank cam arm that slidably retains at least one protuberance extending from the other of the cam rod or the bell crank cam arm. For example, the track may be a helical track within the bell crank cam arm, and the protuberance may outwardly extend from the cam rod. As another example, the track may be a helical track formed in the cam rod, and the protuberance may extend from a portion of the bell crank cam arm. The jackscrew interface may be configured to maintain a desired positional relationship of the droop panel in relation to the flap over an entire range of motion of the flap and the droop panel.

The droop panel may include an upper surface connected to a lower surface, a leading edge, and a trailing edge. A hinge coupling may forwardly extend proximate to the leading edge, and a link coupling may extend from the lower surface. The hinge coupling may moveably couple the droop panel to a hinge fitting. The hinge fitting may include a bracket that moveably retains a first portion of the cam rod and a second portion of the bell crank cam arm.

In at least one example, the cam rod moveably extends into an opening of the bell crank cam arm. The cam rod may be rotationally constrained. The cam rod may be configured to linearly translate via the jackscrew interface as the bell crank cam arm rotates.

A distal end of the bell crank cam arm may be laterally offset from a central longitudinal axis of the cam rod when the flap is in a retracted position. The distal end may be positioned behind the longitudinal axis of the cam rod when the flap in a fully deployed position.

Certain examples of the present disclosure provide a camber adjustment method for a wing of an aircraft. The camber adjustment method includes moveably coupling a cam rod to a droop panel that is moveably coupled to a portion of the wing, moveably coupling a bell crank cam arm to a flap, providing a jackscrew interface between the cam rod and the bell crank cam arm, and moving the droop panel, in response to movement of the flap, via the jackscrew interface.

The camber adjustment method may include operatively coupling a flap actuator to the flap, and moving the flap between a retracted position and a deployed position with the flap actuator. The moveably coupling the cam rod to the droop panel may include moveably coupling the cam rod to the droop panel with a coupler link. The moveably coupling the bell crank cam arm to the flap may include moveably coupling the bell crank cam arm to the flap with a link arm. The providing the jackscrew interface may include providing a track on or within one of the cam rod or the bell crank cam arm that slidably retains at least one protuberance extending from the other of the cam rod or the bell crank cam arm.

Certain examples of the present disclosure provide an aircraft that includes a fuselage, and wings outwardly extending from the fuselage. Each of the wings includes a main body and a camber adjustment system connected to the main body.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

Certain examples of the present disclosure provide camber adjustment systems and methods for aircraft wings. The camber adjustment system includes a droop panel coupled to a flap via a coupler link that connects to a bell crank cam arm through a cam rod. The bell crank cam arm couples to the cam rod through a jackscrew interface. In at least one example, the camber adjustment system is devoid of a dedicated droop actuator. Instead, the droop panel moves in response to motion of the flap, which is operatively connected to a flap actuator.

Examples of the present disclosure allow for a desired and precise positional relationship between the droop panel and the flap over an entire range of motion of the flap. A timing schedule for the droop panel and the flap is dictated by the parameters of the jackscrew interface (such as a pitch of a threaded interface), thereby allowing every positional and temporal requirement between the droop panel and the flap to be met. Moreover, the camber adjustment system allows for configuration flexibility so as to be incorporated into smaller and tighter spaces (as certain wing designs are becoming lighter and more compact). The bell crank cam arm allows for a tight integration area and relatively small sweep range of motion, thereby taking up less space within a wing and enabling increased space for additional routing of other systems within the wing.

Figure 1:
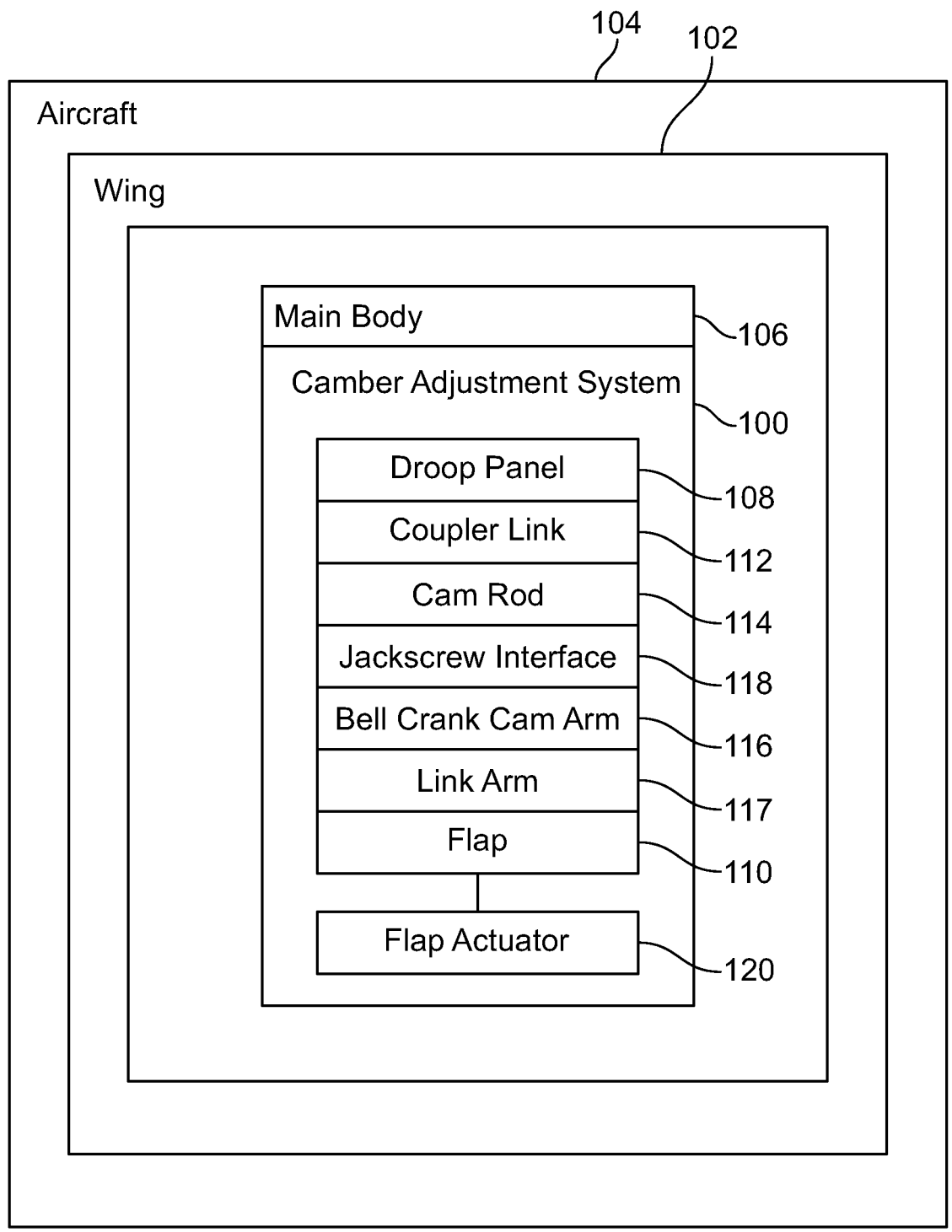
FIG. 1 illustrates a schematic block diagram of a camber adjustment system of a wing of an aircraft, according to an example of the present disclosure.

FIG. 1 illustrates a schematic block diagram of a camber adjustment system 100 of a wing 102 of an aircraft 104, according to an example of the present disclosure. The wing 102 includes a main body 106 and the camber adjustment system 100 connected to the main body 106.

The camber adjustment system 100 includes a droop panel 108 moveably coupled to a flap 110. A coupler link 112 is moveably connected to the droop panel 108. A cam rod 114 is coupled to the coupler link 112. The cam rod 114 is also coupled to a bell crank cam arm 116, which, in turn, connects to the flap 110 through a link arm 117. Alternatively, the bell crank cam arm 116 may directly couple to the flap 110 without a distinct link arm. Also, alternatively, the cam rod 114 may moveably connect to the droop panel 108 without a distinct coupler link.

A jackscrew interface 118 controls relative motion between the cam rod 114 and the bell crank cam arm 116. In at least one example, the jackscrew interface 118 includes a track, such as a helical or spiral track, formed in the bell crank cam arm 116, and one or more protuberances (such as posts, studs, a cross bar, or the like) of the cam rod 114 that are moveably retained within the track. In at least one other example, the cam rod 114 may include the track, while the bell crank cam arm 116 includes one or more protuberances (such as posts, studs, a cross bar, or the like) that is moveably retained within the track. Alternatively, the jackscrew interface 118 may include outer threads of the cam rod 114 that threadably engage inner threads of the bell crank cam arm 116. The cam rod 114 and the bell crank cam arm 116 having the jackscrew interface 118 therebetween provide a mechanism that may transform rotational motion into linear motion, or vice versa.

The jackscrew interface 118 is shaped and sized to achieve a desired positional relationship between the droop panel 108 and the flap 110 throughout an entire range of motion, such as between a retracted position of the flap 110 and a full deployed position of the flap 110. For example, a pitch of a track of the bell crank cam arm 116 or the cam rod 114 may be sized and shaped having a desired pitch that corresponds to a desired positional relationship between the droop panel 108 and the flap 110. The jackscrew interface 118 may be sized and shaped to synchronize a desired positional relationship of the droop panel 108 in relation to the flap 110 over an entire range of motion of the flap 110 and the droop panel 108.

The cam rod 114 and the bell crank cam arm 116 may each moveably couple to a beam fitting (such as a hinge fitting) within the main body 106. In at least one example, the cam rod 114 is slidably retained within a channel formed through a portion of the beam fitting. The cam rod 114 extends through the channel of the beam fitting and couples to the bell crank cam arm 116, which is pivotally retained within the beam fitting.

A flap actuator 120 is operatively coupled to the flap 110. The flap actuator 120 is configured to move the flap 110 between a retracted position and a fully deployed position. The flap actuator 120 may be one or more of an electric motor, a hydraulic motor, a pneumatic motor, one or more powered pistons, and/or the like that is configured to move the flap 110 between a retracted (such as a stowed) position and a deployed (for example, fully extended) position.

In operation, as the flap actuator 120 operates to move the flap 110, the droop panel 108 moves in response to the motion of the flap 110 by way of the cam rod 114 moveably engaging the bell crank cam arm 116 through the jackscrew interface 118. The camber adjustment system 100 is devoid of a dedicated droop actuator directly coupled to the droop panel 108. The lack of a dedicated droop actuator leads to a more compact and lighter camber adjustment system 100 that occupies less space within the wing 102 (thereby allowing for other components to be positioned and/or routed therein) and reduces the weight of the wing 102.

As described herein, examples of the present disclosure provide the camber adjustment system 100 for the wing 102 of the aircraft 104. The camber adjustment system 100 includes the droop panel 108 that is configured to pivotally couple to a portion of the wing 102, the flap 110, the cam rod 114 moveably coupled to the droop panel 108, the bell crank cam arm 116 moveably coupled to the flap 110, and the jackscrew interface 118 between the cam rod 114 and the bell crank cam arm 116. The droop panel 108 is configured to move in response to movement of the flap 110 via the jackscrew interface 118.

Figure 2:
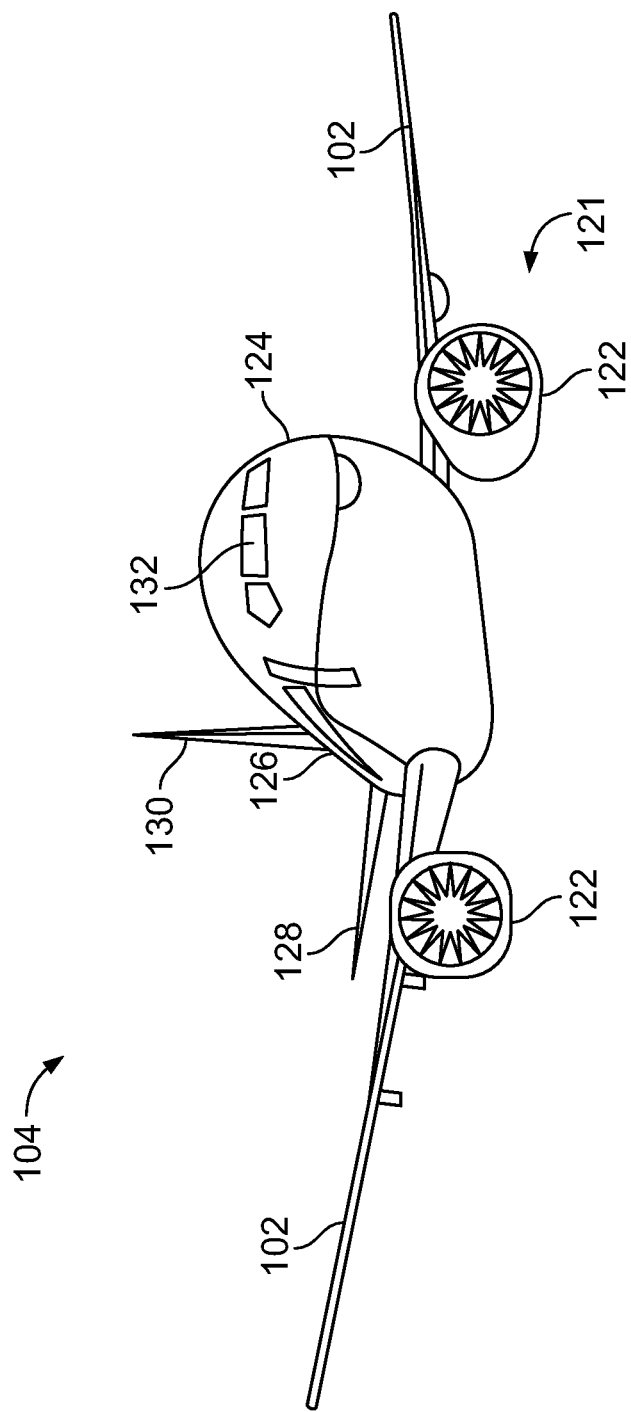
FIG. 2 illustrates a front perspective view of an aircraft, according to an example of the present disclosure.

FIG. 2 illustrates a front perspective view of an aircraft 104, according to an example of the present disclosure. The aircraft 104 includes a propulsion system 121 that may include two turbofan engines 122, for example. Optionally, the propulsion system 121 may include more engines 122 than shown. The engines 122 may be carried by wings 102 of the aircraft 104. In other examples, the engines 122 may be carried by a fuselage 124 and/or an empennage 126. The empennage 126 may also support horizontal stabilizers 128 and a vertical stabilizer 130. The fuselage 124 of the aircraft 104 defines an internal cabin, which may include a cockpit 132, one or more work sections (for example, galleys, personnel carry-on baggage areas, and the like), one or more passenger sections (for example, first class, business class, and coach sections), and/or the like.

Figure 3:
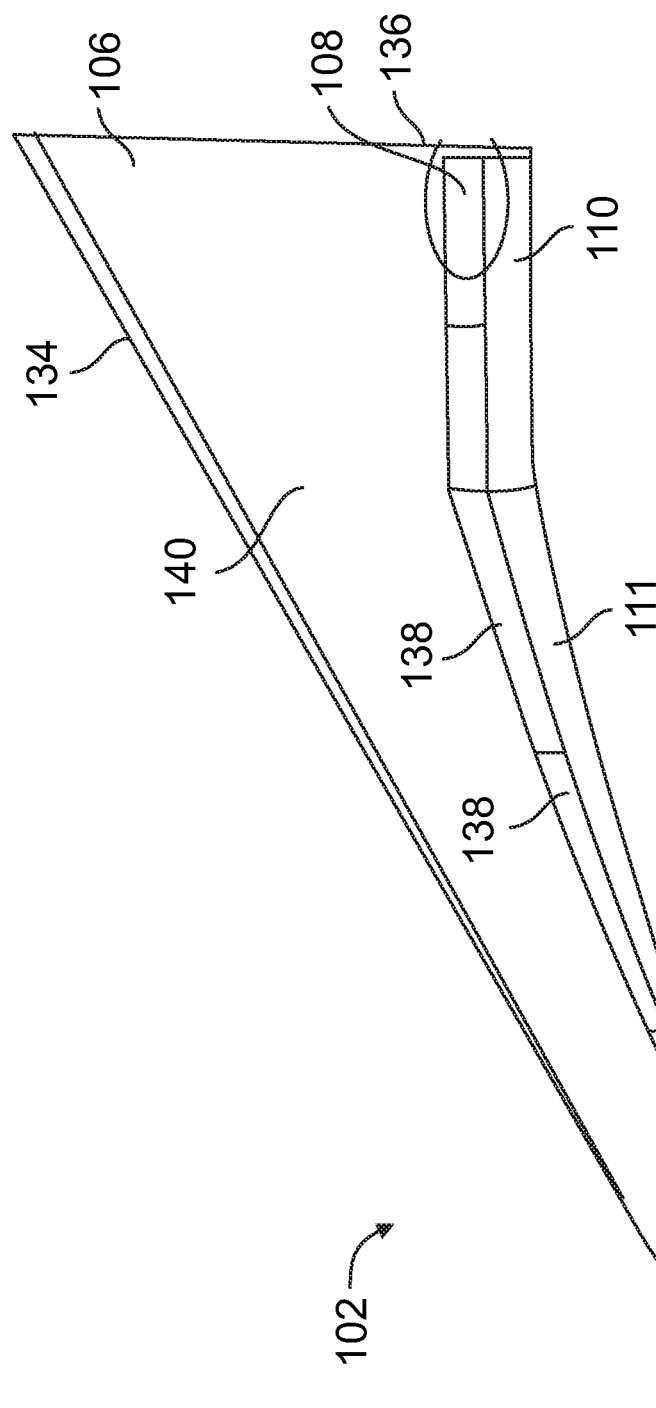
FIG. 3 illustrates a top plan view of a wing, according to an example of the present disclosure.

FIG. 3 illustrates a top plan view of a wing 102, according to an example of the present disclosure. The wing 102 includes the main body 106 having a leading rounded edge 134 and a trailing edge 136. One or more droop panels 108 extend from the trailing edge 136. The droop panel(s) 108 may be inboard (that is, closer to the fuselage 124 shown in FIG. 2) from spoilers 138, which are configured to be downwardly moved below a plane of an upper surface 140 of the wing 102 and upwardly moved above the plane of the upper surface 140 of the wing 102. In contrast, the droop panel(s) 108 may be configured to only be moved below (and may be moved slightly above) the plane of the upper surface 140 of the wing 102. Optionally, the droop panel(s) 108 may be anywhere above one or more of the flaps 110.

Flaps 110 and 111 are positioned behind (that is, towards the aft of the aircraft 104 shown in FIG. 2) the droop panel 108 and the spoilers 138. At least a portion of the flap 110 is positioned underneath the droop panel 108.

Figure 4:
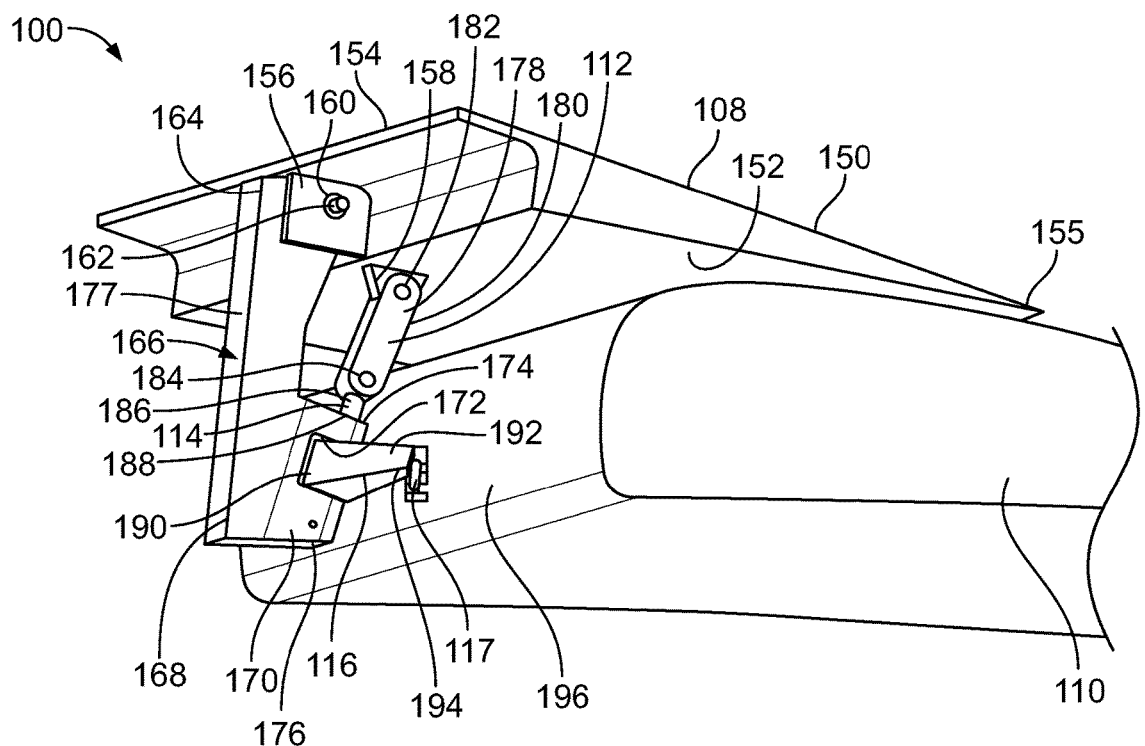
FIG. 4 illustrates a perspective front view of a camber adjustment system (in which a flap is in a retracted position), according to an example of the present disclosure.

FIG. 4 illustrates a perspective front view of the camber adjustment system 100 (in which the flap 110 is in a retracted position), according to an example of the present disclosure. The droop panel 108 includes an upper surface 150 connected to a lower surface 152, a leading edge 154, and a trailing edge 155. A hinge coupling 156 forwardly extends from and/or proximate to the leading edge 154, while a link coupling 158 extends from the lower surface 152. The link coupling 158 may be positioned closer to the trailing edge 155 than the hinge coupling 156.

The hinge coupling 156 includes an opening 160 that pivotally retains a pin 162 extending from an upper portion 164 of a hinge fitting 166. The hinge fitting 166 is fixed to and/or within the main body 106 of the wing 102 (shown in FIG. 1, for example). The hinge fitting 166 may be part of or otherwise secured to a spoiler beam, which may be an I-beam extending through at least a portion of the wing 102. Optionally, the hinge coupling 156 may include the pin, and the upper portion 164 of the hinge fitting 166 may include the opening 160.

The hinge fitting 166 includes a lower portion 168 opposite from the upper portion 164. The lower portion 168 includes a canted bracket 170 that includes a rear aperture 172 between an upper prong 174 and a lower prong 176. The bracket 170 may be angled in relation to a main body 177 of the hinge fitting 166. Optionally, the bracket 170 may not be canted or otherwise angled in relation to the main body 177. The bracket 170 retains a portion of the cam rod 114 (such as a portion that extends through a channel of the upper prong 174), and a portion of the bell crank cam arm 116 (such as an expanded portion within aperture 172).

The coupler link 112 includes a main body 178, which may include linear beams 180. An upper end 182 of the main body 178 pivotally couples to the link coupling 158 (which may be or include a fin extending between the linear beams 180), such as through a pinned connection, bearings, and/or the like. A lower end 184 of the main body 178 couples to an upper end 186 of the cam rod 114, such as through a pinned connection, bearings, and/or the like.

The cam rod 114 includes a main body 188 (which may be tubular, cylindrical, or the like) that extends through a channel formed through the upper prong 174 of the canted bracket 170. The main body 188 extends through the channel of the upper prong 174 and into an end 190 (for example, an expanded end) of the bell crank cam arm 116. For example, the main body 188 extends into an opening formed through the end 190. In at least one example, the jackscrew interface 118 (shown in FIG. 1) is between the cam rod 114 and the bell crank cam arm 116 within the end 190 of the bell crank cam arm 116.

The bell crank cam arm 116 may include a tapered body 192 that reduces in size from the end 190 to a distal end 194. The distal end 194 pivotally couples to the link arm 117, which, in turn, pivotally couples to a fore end 196 of the flap 110.

As shown in FIG. 4, the flap 110 is in a retracted or stowed position. When the flap 110 is in the retracted position, the distal end 194 of the bell crank cam arm 116 is laterally positioned away from a central longitudinal axis of the cam rod 114.

In operation, the flap actuator 120 (shown in FIG. 1) drives the flap 110 to move between the retracted position and a fully deployed position. In response to the flap 110 moving, the droop panel 108 moves, as described herein. That is, the motion of the flap 110 drives the motion of the droop panel 108.

Figure 5:
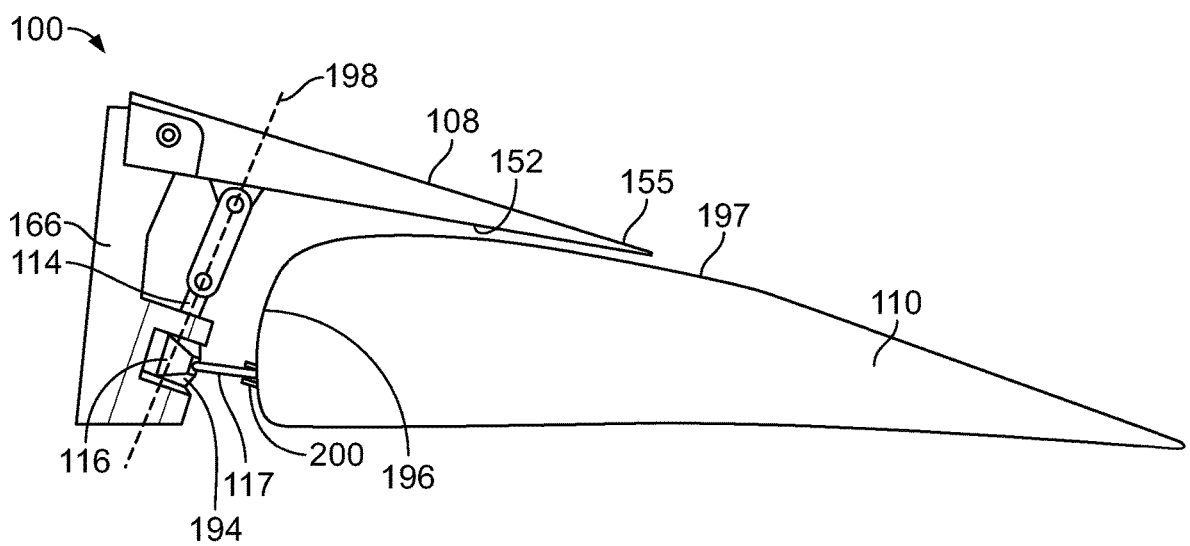
FIG. 5 illustrates a lateral view of a camber adjustment system having a flap in a retracted position, according to an example of the present disclosure.
Figure 6:
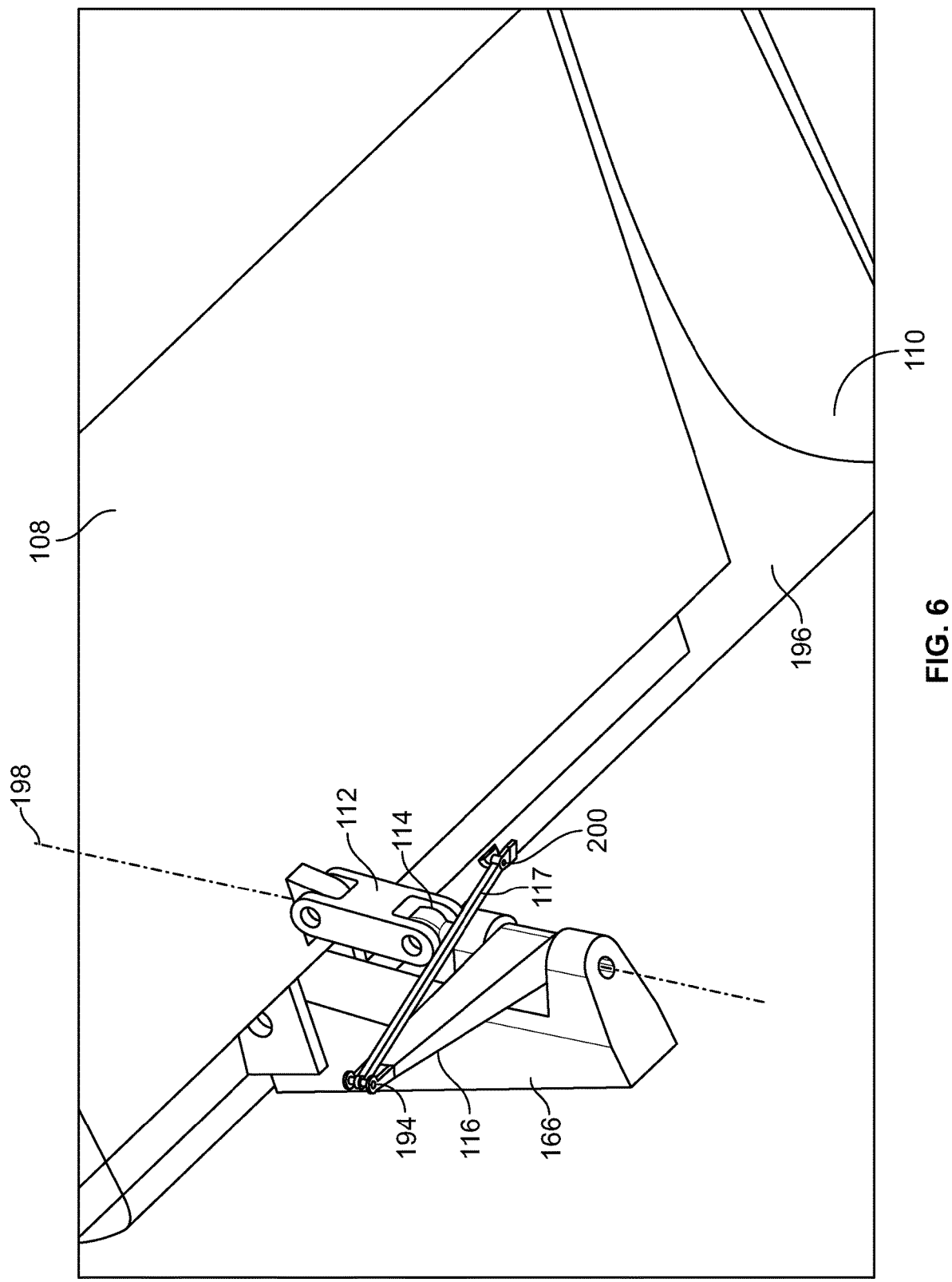
FIG. 6 illustrates a perspective bottom view of the camber adjustment system having the flap in the retracted position, according to an example of the present disclosure.
Figure 7:
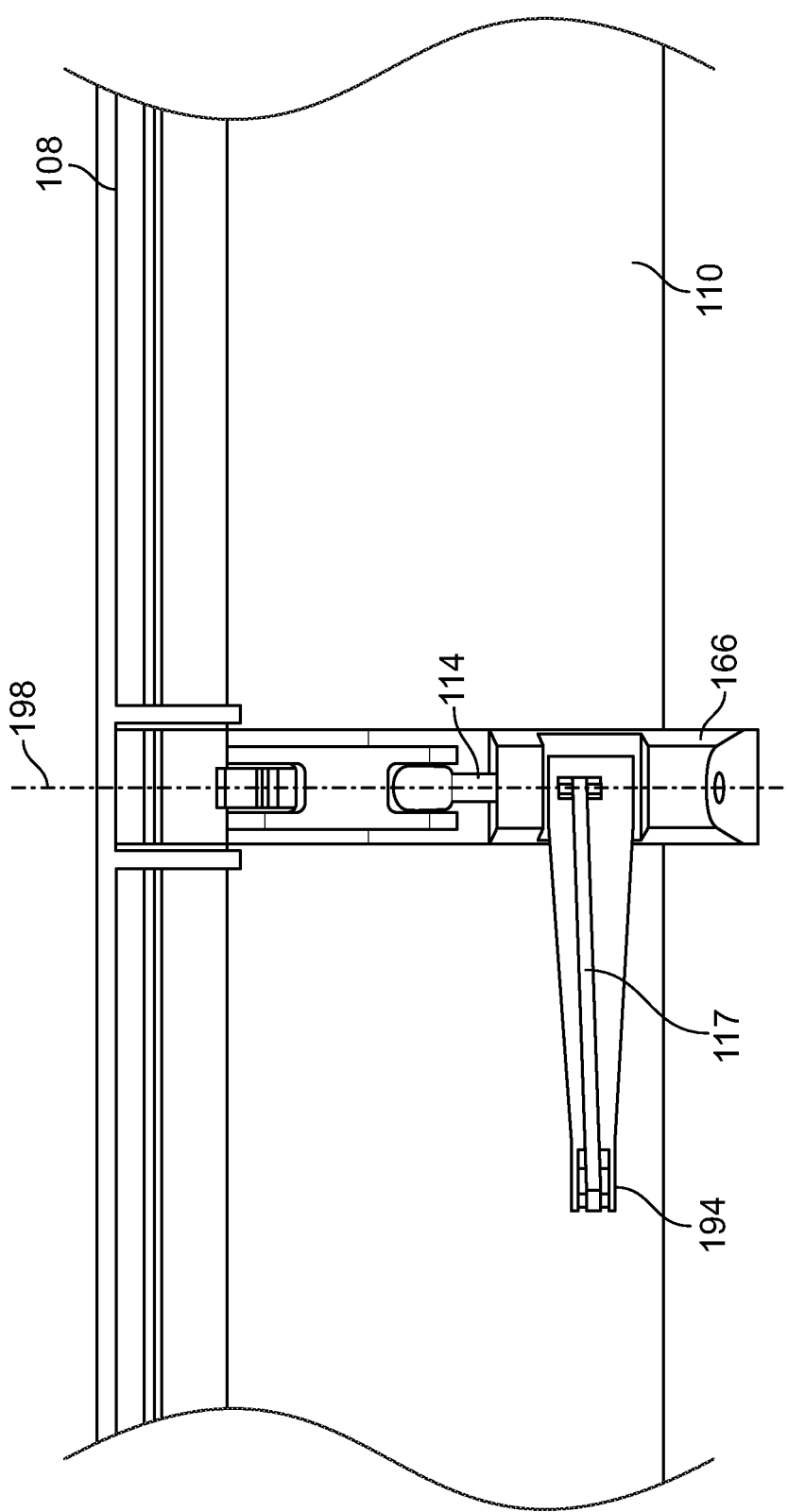
FIG. 7 illustrates a rear view of the camber adjustment system having the flap in the retracted position, according to an example of the present disclosure.

FIG. 5 illustrates a lateral view of the camber adjustment system 100 having the flap 110 in the retracted position, according to an example of the present disclosure. FIG. 6 illustrates a perspective bottom view of the camber adjustment system 100 having the flap 110 in the retracted position. FIG. 7 illustrates a rear view of the camber adjustment system 100 having the flap 110 in the retracted position (the flap 110 is shown transparent in FIGS. 6 and 7, in order to show components of the camber adjustment system 100). Referring to FIGS. 5-7, in the retracted position, the droop panel 108 is positioned in front of and over the fore end 196 of the flap 110. In the retracted position, the lower surface 152 of the trailing edge 155 of the droop panel 108 overlays and may abut into an upper surface 197 of the flap 110. Further, in the retracted position, the distal end 194 of the bell crank cam arm 116 is laterally offset away from the longitudinal axis 198 of the cam rod 114. As such, the link arm 117 angles back in an opposite direction, where an opposite end of the link arm 117 is pivotally coupled to a flap fitting 200.

Figure 8:
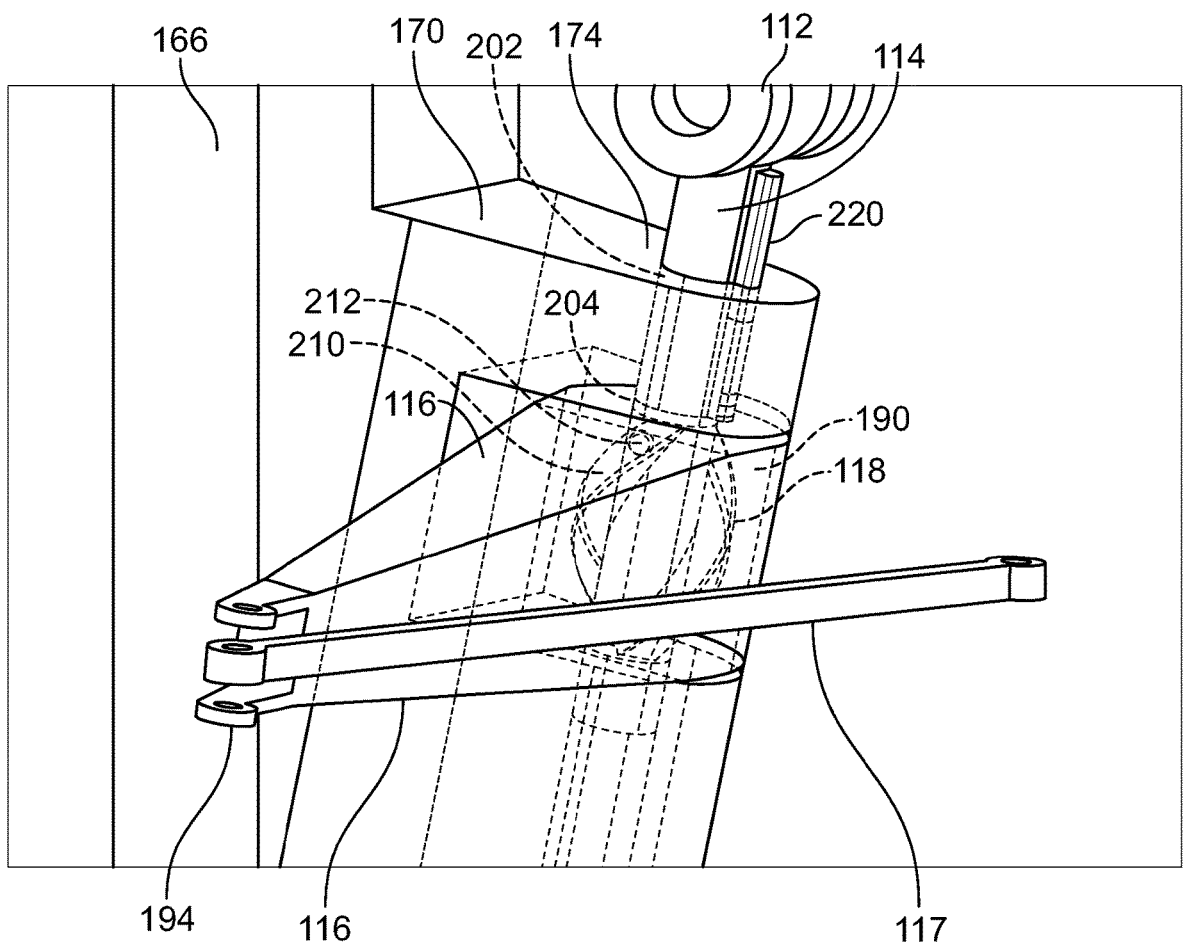
FIG. 8 illustrates a perspective internal view of a jackscrew interface within a bell crank cam arm of a camber adjustment system, according to an example of the present disclosure.

FIG. 8 illustrates a perspective internal view of the jackscrew interface 118 within the bell crank cam arm 116 of the camber adjustment system 100, according to an example of the present disclosure. The bell crank cam arm 116 is shown transparent, in order to show the jackscrew interface 118. As shown, the main body 188 of the cam rod 114 extends through the channel 202 formed through the upper prong 174 of the canted bracket 170. The main body 188 extends through the channel 202 of the upper prong 174 and into an opening or passage 204 formed through the end 190 of the bell crank cam arm 116. As shown, the jackscrew interface 118 is between the cam rod 114 and the bell crank cam arm 116 within the end 190 of the bell crank cam arm 116.

In at least one example, the jackscrew interface 118 includes a helical threaded track 210 formed within the end 190. The jackscrew interface 118 also includes one or more protuberances 212 (such as posts, studs, a cross bar, or the like) extending outwardly from the cam rod 114 that are slidably retained within the threaded track 210. The length and pitch of the threaded track 210 may be sized and shaped to provide a desired positional relationship between the droop panel 108 and the flap 110 (shown in FIG. 1, for example) through a range of motion of the flap 110.

An upper portion of the cam rod 114 may also include a linear ridge 220 that is slidably retained within a reciprocal portion of the channel 202. The linear ridge 220 ensures that the cam rod does not rotate relative to the canted bracket 170. That is, while the cam rod 114 may linearly translate relative to the canted bracket 170 in response to motion of the bell crank cam arm 116, the cam rod 114 remains rotationally constrained.

Referring to FIGS. 1 and 4-8, the rotationally constrained cam rod 114 linearly translates via the jackscrew interface 118 as the bell crank cam arm 116 is rotated by motion of the flap 110. As the flap 110 is moved by the flap actuator (such as in a downward direction), the motion of the flap 110 pulls on the link arm 117, which causes the distal end 194 of the bell crank cam arm 116 to rearwardly pivot, thereby causing the bell crank cam arm 116 to rotate within the bracket 170. As the bell crank cam arm 116 rotates within the bracket 170, the jackscrew interface 118 causes the cam rod 114 to downwardly linearly move, as the protuberances 212 slide through the threaded track 210. As the cam rod 114 downwardly moves, the coupler link 112 moves in response thereto, causing the droop panel 108 to pivot downwardly. As such, the motion of the flap 110 causes a corresponding motion of the droop panel 108 via the jackscrew interface 118 between the cam rod 114 and the bell crank cam arm 116.

Figure 9:
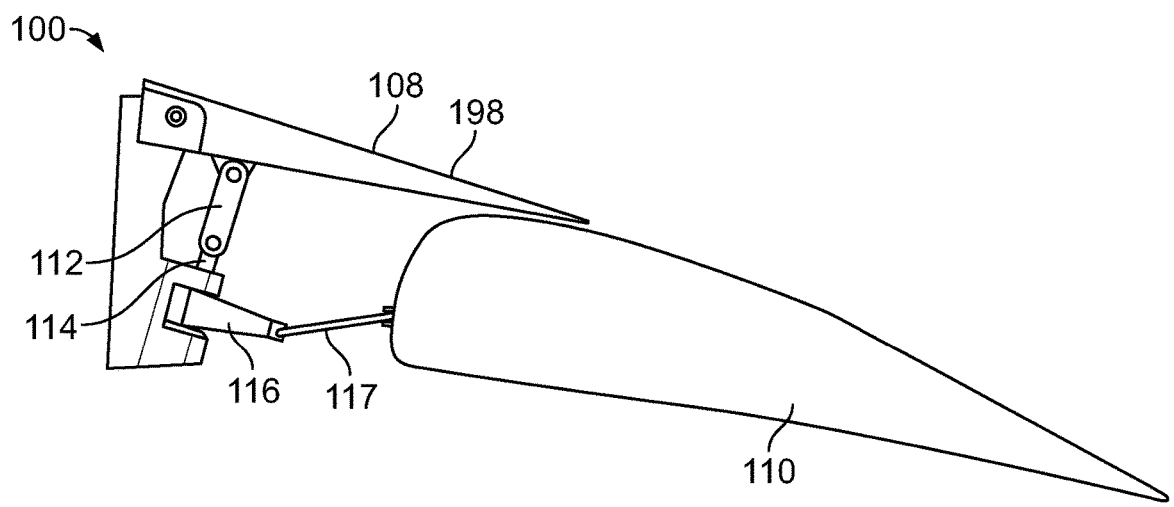
FIG. 9 illustrates a lateral view of a camber adjustment system having a flap in a partially deployed position, according to an example of the present disclosure.
Figure 10:
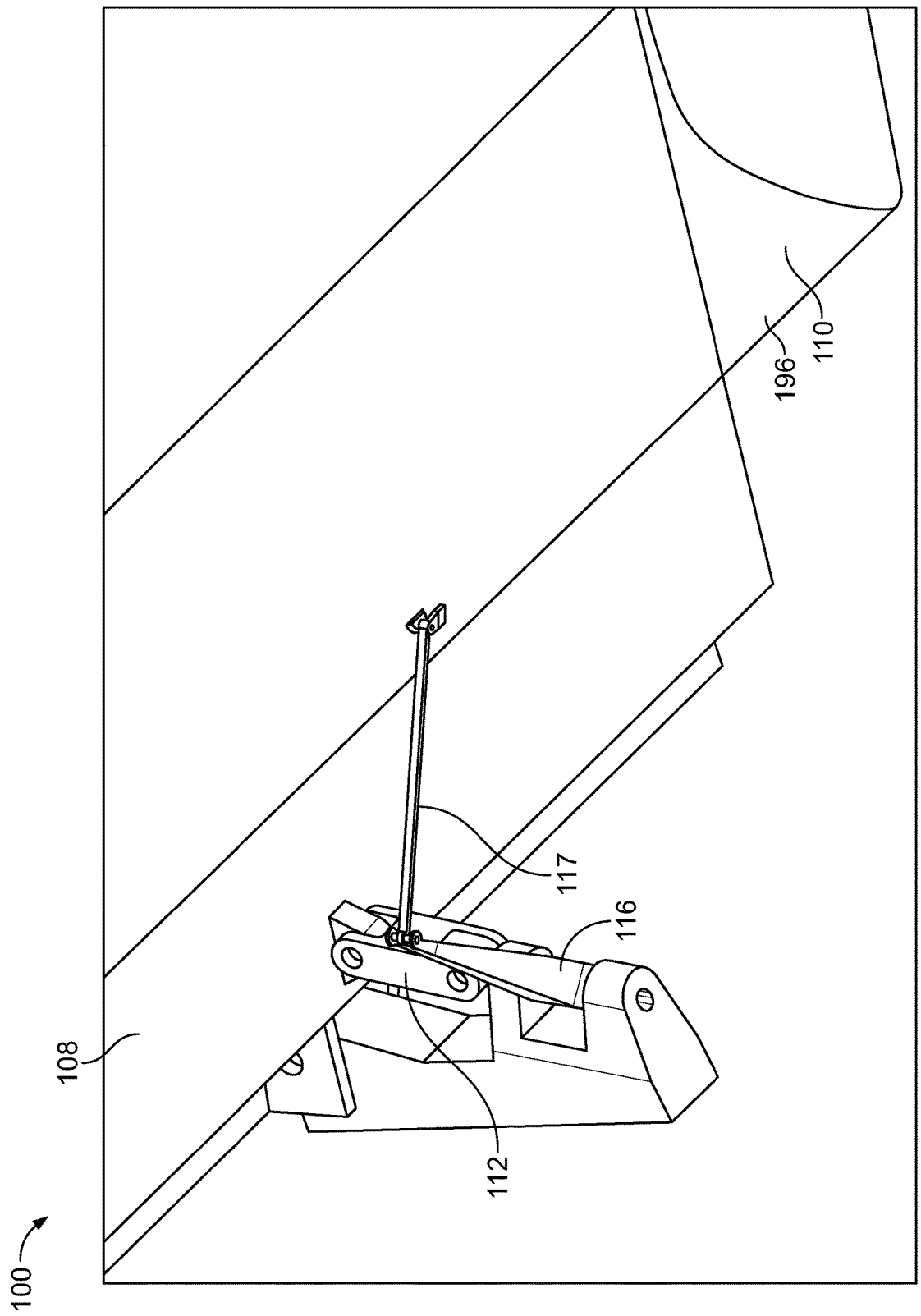
FIG. 10 illustrates a perspective bottom view of the camber adjustment system having the flap in the partially deployed position, according to an example of the present disclosure.
Figure 11:
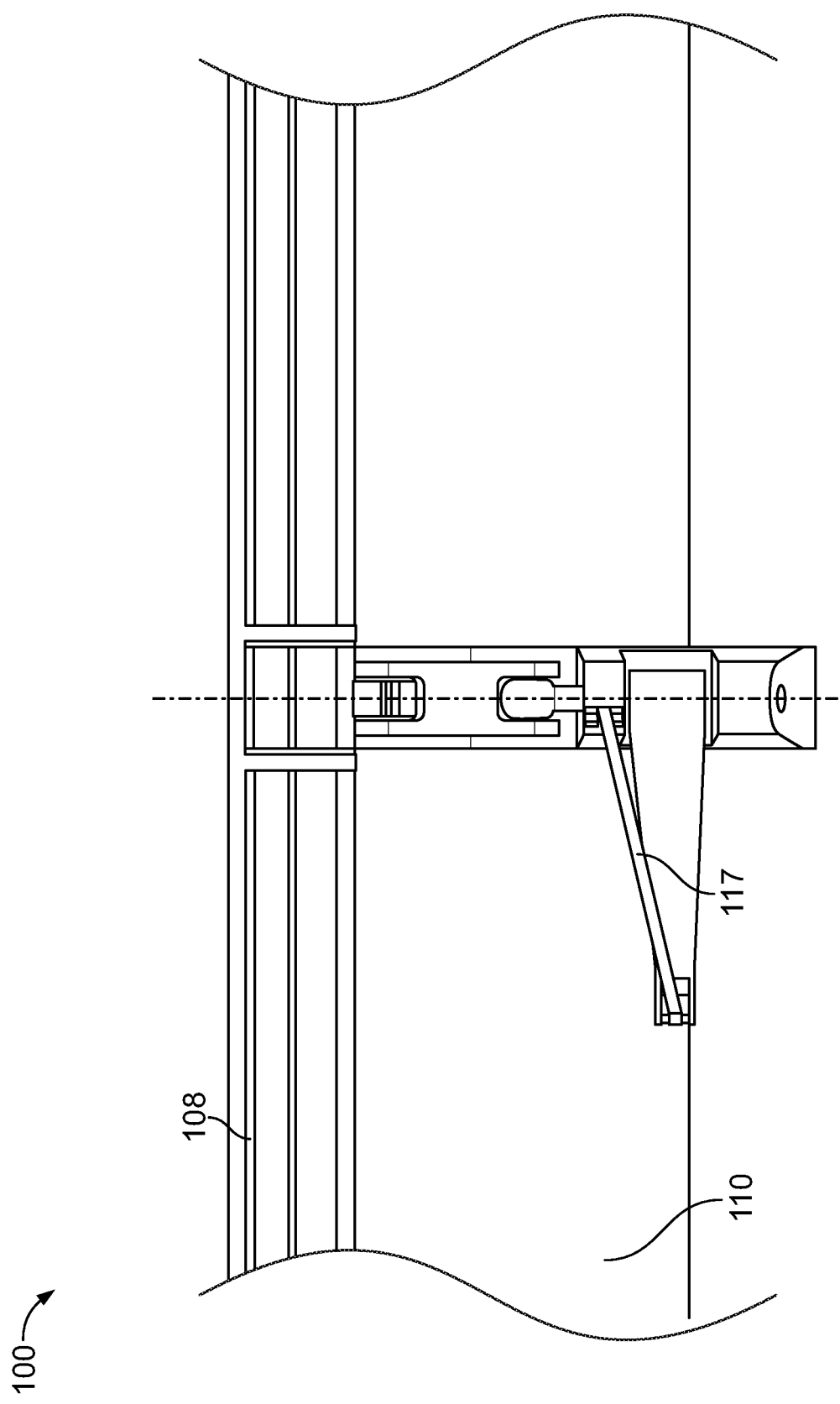
FIG. 11 illustrates a rear view of the camber adjustment system having the flap in the partially deployed position, according to an example of the present disclosure.

FIG. 9 illustrates a lateral view of the camber adjustment system 100 having the flap 110 in a partially deployed position, according to an example of the present disclosure. FIG. 10 illustrates a perspective bottom view of the camber adjustment system 100 having the flap 110 in the partially deployed position. FIG. 11 illustrates a rear view of the camber adjustment system 100 having the flap 110 in the partially deployed position (the flap 110 is shown transparent in FIGS. 10 and 11, in order to show components of the camber adjustment system 100). Referring to FIGS. 9-11, as the flap 110 is moved towards a deployed position, the bell crank cam arm 116 rearwardly pivots towards the fore end 196 of the flap 110 via the link arm 117. The pivoting of the bell crank cam arm 116 pulls the cam rod 114 downwardly via the jackscrew interface 118 (shown in FIGS. 1 and 8), thereby causing the droop panel 108 to downwardly pivot.

Figure 12:
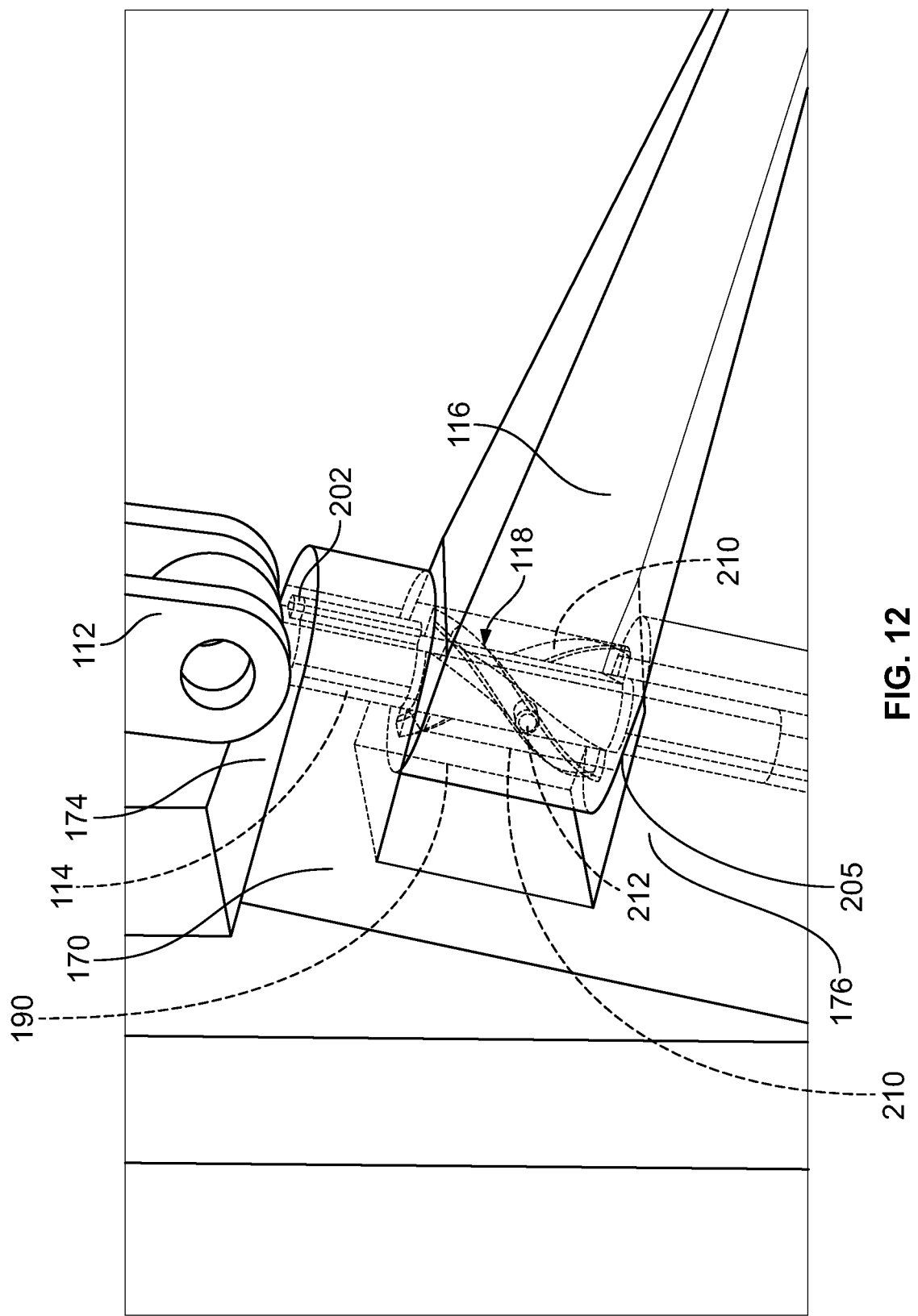
FIG. 12 illustrates a perspective internal view of the jackscrew interface within a rearwardly-pivoted bell crank cam arm of the camber adjustment system, according to an example of the present disclosure.

FIG. 12 illustrates a perspective internal view of the jackscrew interface 118 within a rearwardly-pivoted bell crank cam arm 116 of the camber adjustment system 100, according to an example of the present disclosure. As the bell crank cam arm 116 rearwardly pivots, the rotation of the bell crank cam arm 116 causes the cam rod 114 to move further down into the end 190, and may pass into (or further into) a channel 205 of the lower prong 176 of the canted bracket 170. Thus, rearward rotation of the bell crank cam arm 116 causes the cam rod 114 to descend further into the end 190 via the jackscrew interface 118. Conversely, an opposite rotational direction (that is, a forward rotation) of the bell crank cam arm 116 causes the cam rod 114 to ascend within the end 190, causing a corresponding upward pivoting of the droop panel 108.

Referring to FIGS. 1 and 4-12, in general, as the flap 110 is moved into a fully deployed position by the flap actuator 120, the droop panel 108 downwardly pivots by way of the cam rod 114 descending further into the end 190 of the rearwardly-rotating bell crank cam arm 116 due to the jackscrew interface 118. As the flap 110 is moved towards the retracted position by the flap actuator 120, the droop panel 108 upwardly pivots by way of the cam rod 114 ascending within the end 190 of the forwardly-rotating bell crank cam arm due to the jackscrew interface 118.

Figure 13:
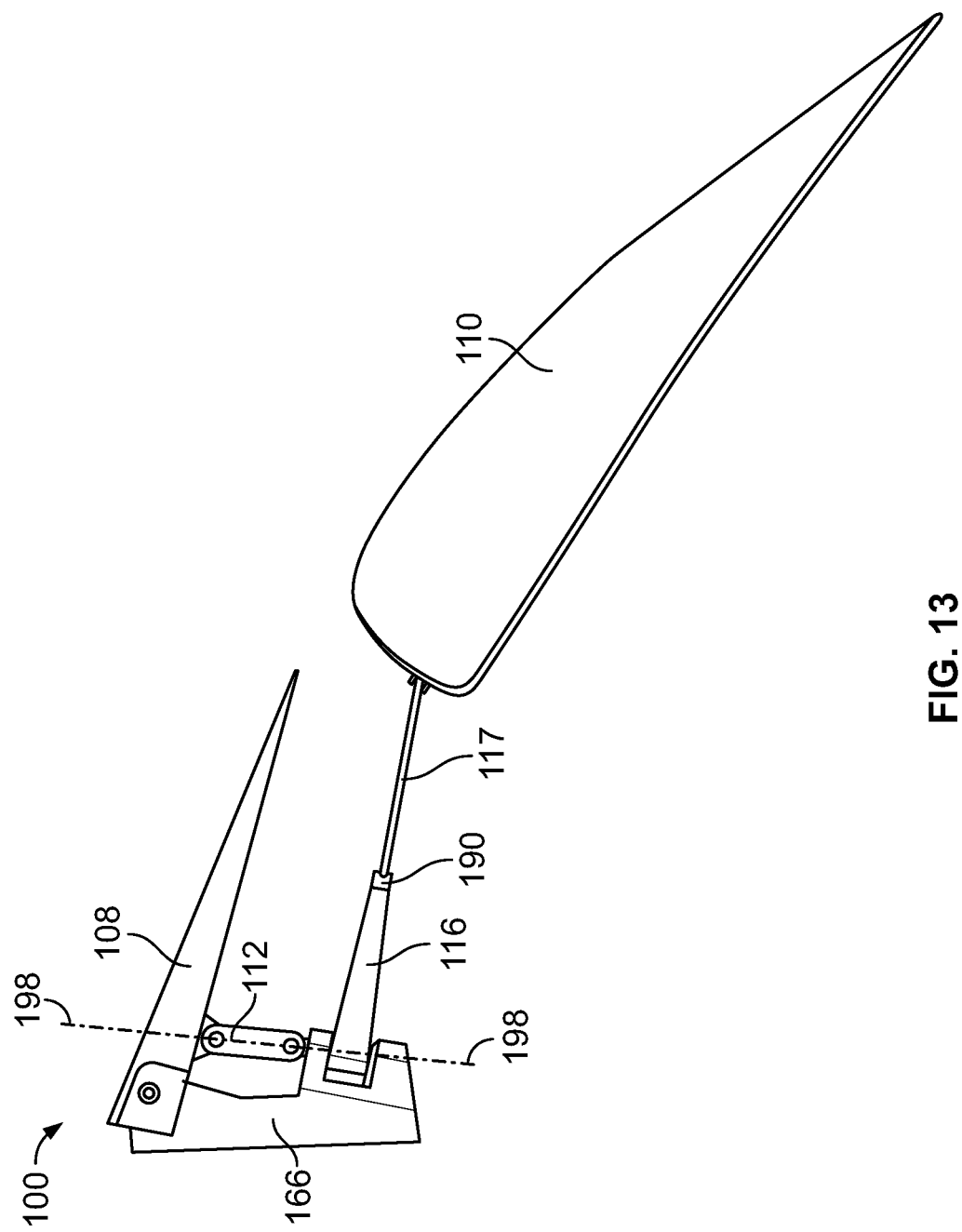
FIG. 13 illustrates a lateral view of a camber adjustment system having a flap in a fully deployed position, according to an example of the present disclosure.
Figure 14:
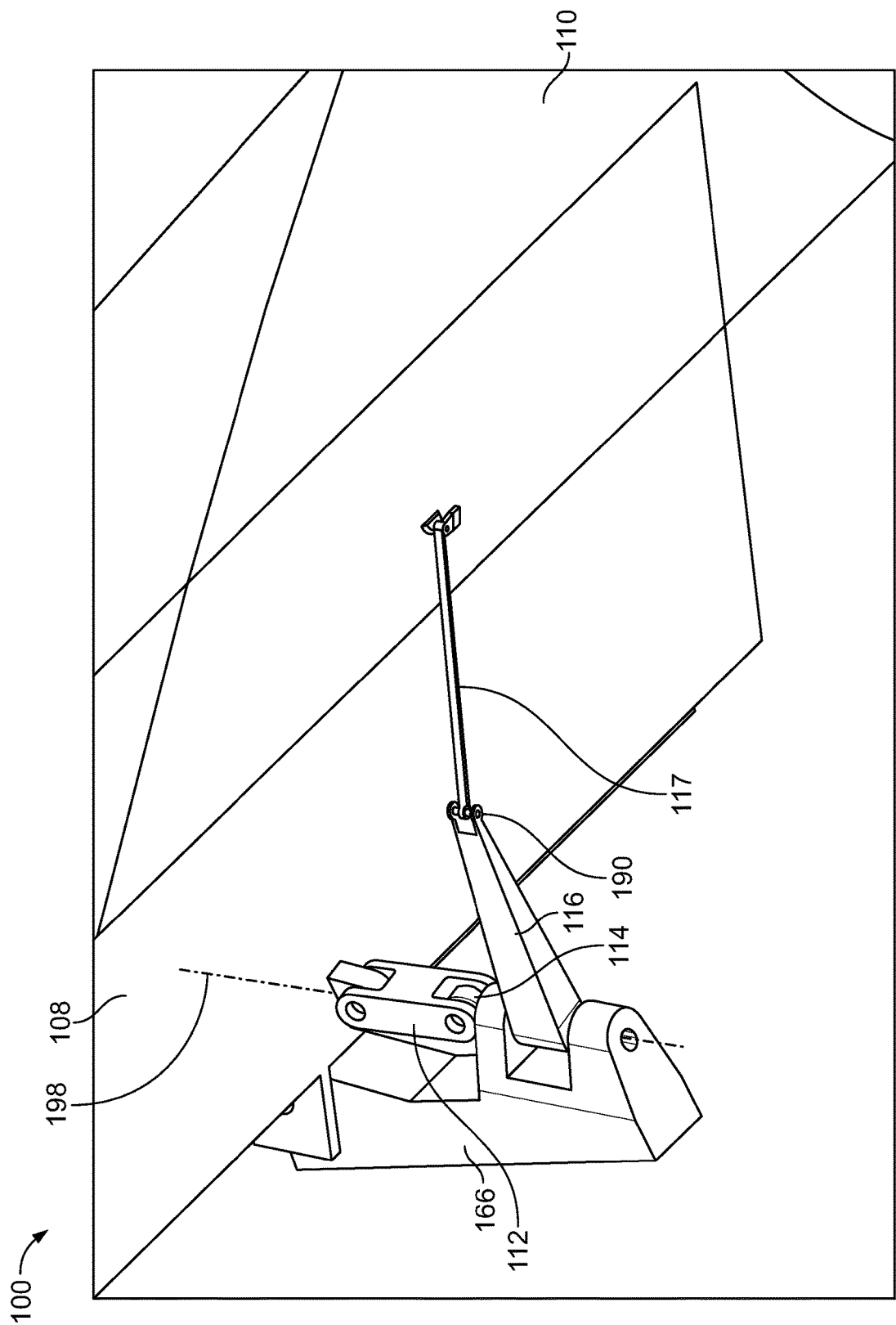
FIG. 14 illustrates a perspective bottom view of the camber adjustment system having the flap in the fully deployed position, according to an example of the present disclosure.
Figure 15:
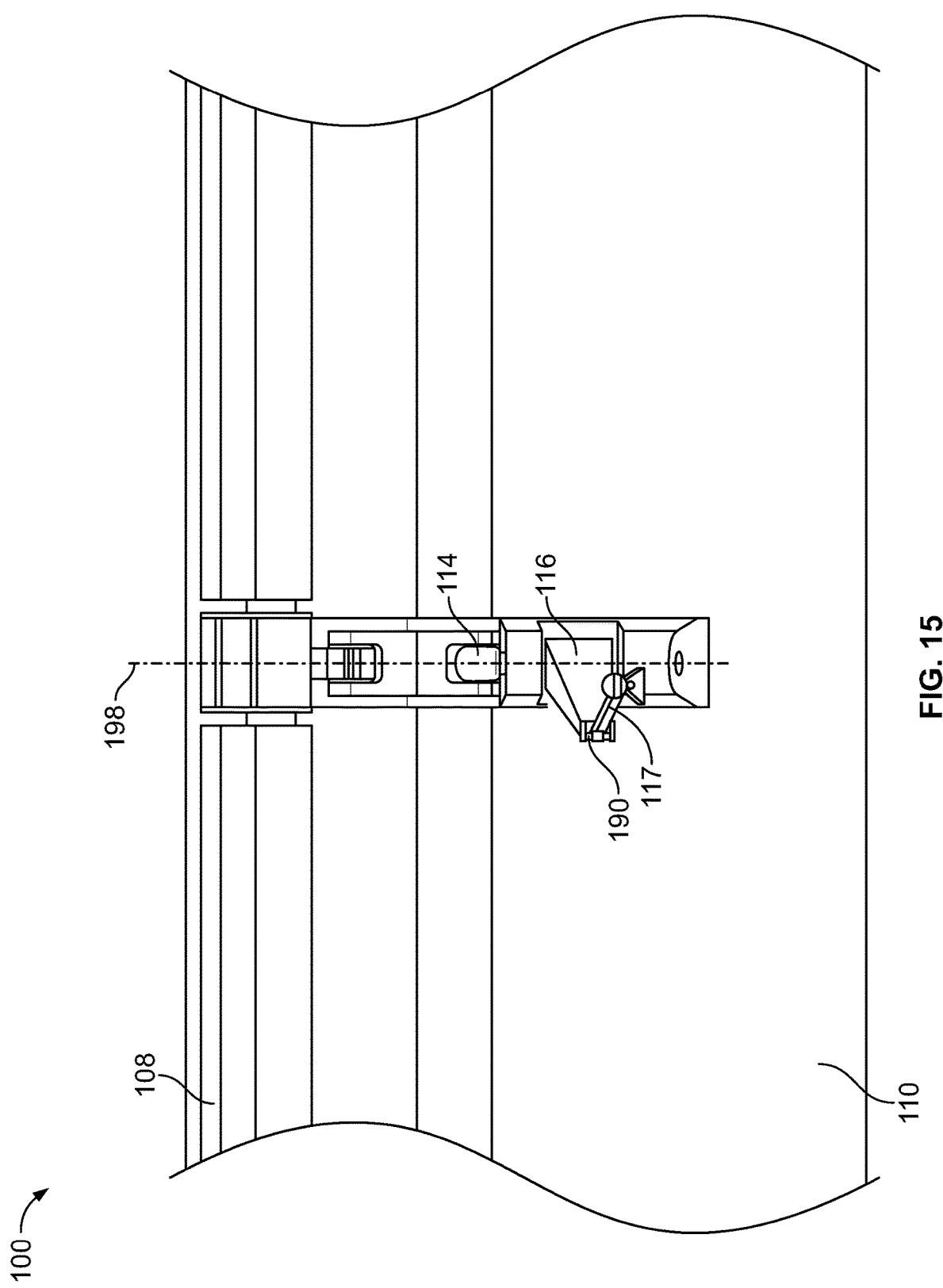
FIG. 15 illustrates a rear view of the camber adjustment system having the flap in the fully deployed position, according to an example of the present disclosure.

FIG. 13 illustrates a lateral view of the camber adjustment system 100 having the flap 110 in a fully deployed position, according to an example of the present disclosure. FIG. 14 illustrates a perspective bottom view of the camber adjustment system 100 having the flap 110 in the fully deployed position. FIG. 15 illustrates a rear view of the camber adjustment system 100 having the flap 110 in the fully deployed position (the flap 110 is shown transparent in FIGS. 14 and 15, in order to show components of the camber adjustment system 100). Referring to FIGS. 13-15, in the fully deployed position, the distal end 190 of the bell crank cam arm 116 is pulled by the link arm 117 behind the longitudinal axis 198 of the cam rod 114 (as opposed to being laterally offset, as in the retracted position). The motion of the flap 110 causes a corresponding motion of the droop panel 108 by way of the jackscrew interface 118 between the cam rod 114 and the bell crank cam arm 116, as described herein.

Referring to FIGS. 1 and 4-15, the camber of the wing 102 increases as the flap 110 moves between the retracted position (shown in FIG. 5, for example) to the fully deployed position (shown in FIG. 13, for example). The motion of the flap 110 causes the droop panel 108 to move in response thereto, by virtue of the jackscrew interface 118 between the cam rod 114 and the bell crank cam arm 116. The motion of the droop panel 108, the flap 110, the cam rod 114, and the bell crank cam arm 116 is reversed as the flap actuator 120 moves the flap 110 from the fully deployed position back to the retracted position.

Figure 16:
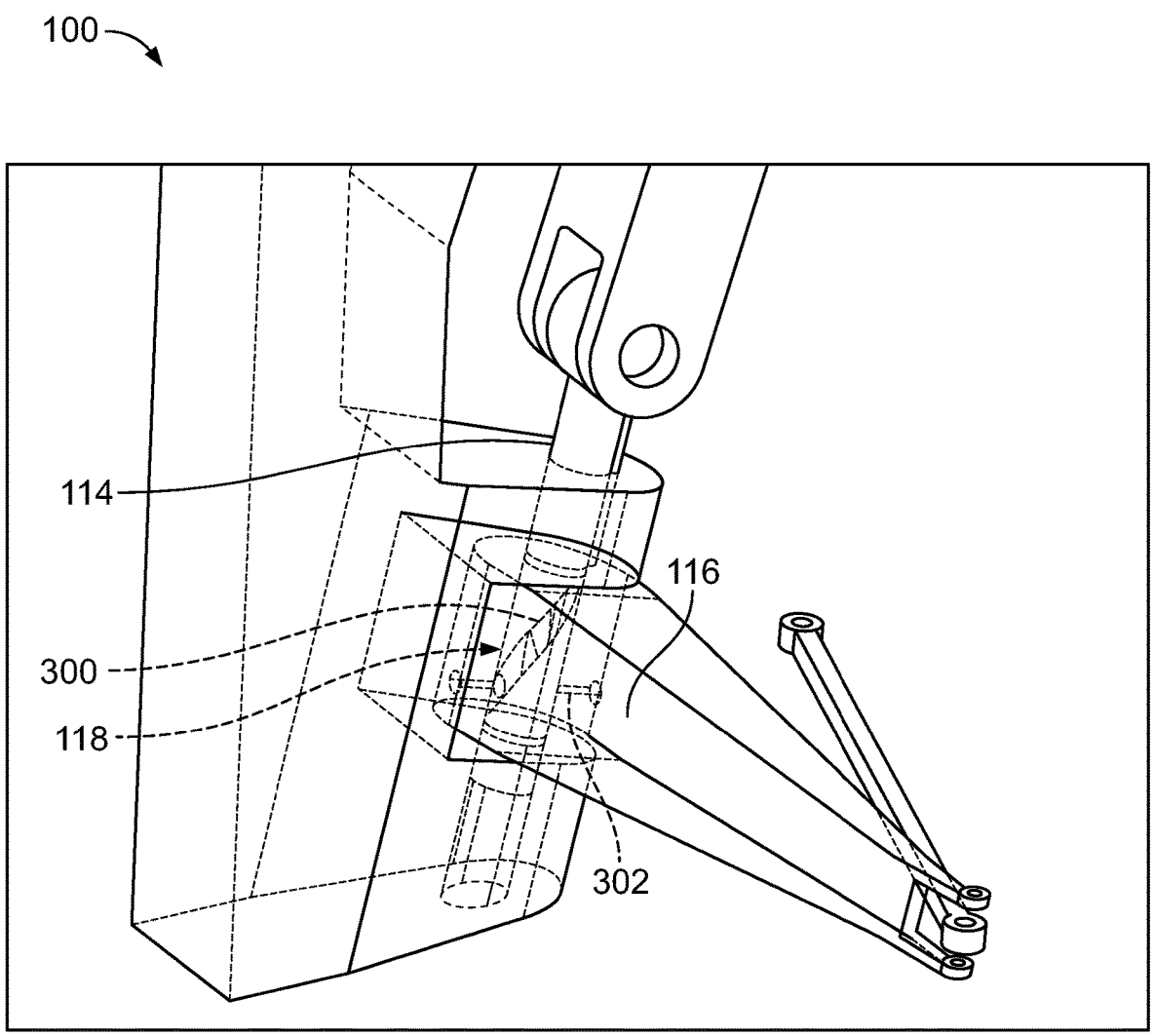
FIG. 16 illustrates a perspective internal view of a jackscrew interface within a bell crank cam arm of a camber adjustment system, according to an example of the present disclosure.

FIG. 16 illustrates a perspective internal view of the jackscrew interface 118 within the bell crank cam arm 116 of the camber adjustment system 100, according to an example of the present disclosure. In this example, the cam rod 114 includes a threaded track 300 formed into a shaft, while the bell crank cam arm 116 includes a protuberance 302 (such as a cross pin) that extends within the threaded track 300.

Figure 17:
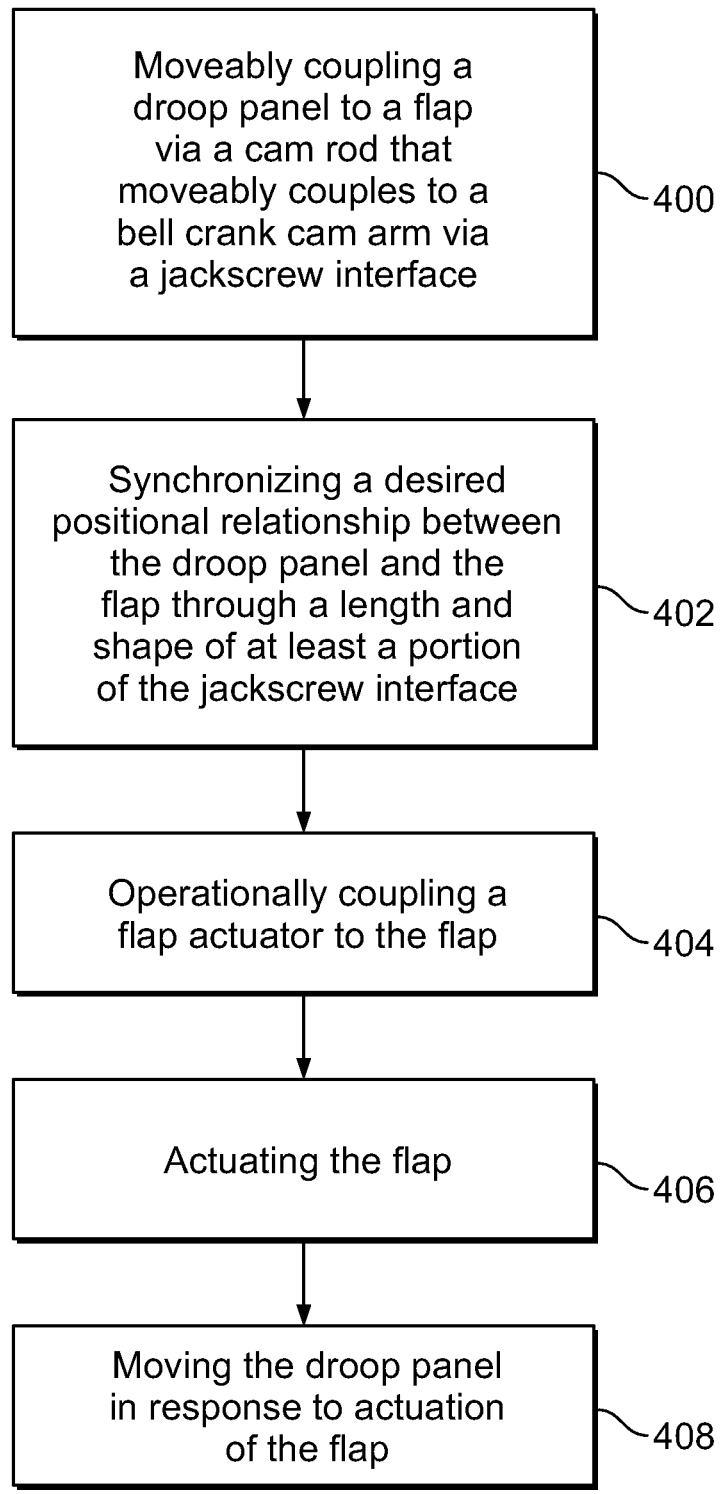
FIG. 17 illustrates a flow chart of a camber adjustment method for a wing of an aircraft, according to an example of the present disclosure.

FIG. 17 illustrates a flow chart of a camber adjustment method 400 for a wing of an aircraft, according to an example of the present disclosure. Referring to FIGS. 1-17, the method 400 includes moveably coupling the droop panel 108 to the flap 110 via the cam rod 114 moveably coupling to the bell crank cam arm 116 via the jackscrew interface 118. The moveably coupling may include pivotally coupling the coupler link 112 to the droop panel 108 and the cam rod 114, and the bell crank cam arm 116 to the flap 110 with the link arm 117.

The method 400 also includes at 402 synchronizing the desired positional relationship of the droop panel 108 in relation to the flap 110 over an entire range of motion of the flap 110 and the droop panel 108. In particular, the synchronizing 402 may include synchronizing the desired positional relationship between the droop panel 108 and the flap 110 through the length and the shape of at least a portion of the jackscrew interface 118, such as the length, shape, pitch, or the like of the threaded track 210 (shown in FIGS. 8 and 12) or the threaded track 300 (shown in FIG. 16).

The method 400 also includes at 406 operatively coupling the flap actuator 120 to the flap 110. At 406, the method 400 includes actuating the flap 110. At 408, the actuating 406 causes the droop panel 108 to move in response thereto via the jackscrew interface 118 between the cam rod 114 and the bell crank cam arm 116. The moving 408 occurs between a retracted (such as a stowed) position and a deployed (for example, fully extended) position of the flap 110.

As described herein, the camber adjustment systems 100 include the cam rod 114 and the bell crank cam arm 116 with the jackscrew interface 118 therebetween. The droop panel 108 moves in response to the flap 110. As such, a separate and distinct dedicated droop actuator is not necessary.

Various parameters (such as length and/or pitch of a threaded track) of the jackscrew interface 118 may be tailored to meet exact positional requirements of the droop panel 108 and the flap 110 at each and every particular position along a range of motion of the flap 110, in contrast to certain previous linkages that typically ensure only three positions of accuracy. Further, the camber adjustment systems 100 reduce the number of components within the wing 102, thereby allowing for thinner and lighter wings. Moreover, because of the compact, simplified design of the camber adjustment systems 100, additional space is available within the wing 102 for various other components (such as wiring, hydraulic lines, and/or the like).

Examples of the present disclosure provide compact and efficient camber adjustment systems that occupy a reduced amount of space within a wing. Further, examples of the present disclosure provide lighter and less complex camber adjustment systems and methods. The camber adjustment systems and methods may be devoid of a dedicated droop actuator, and/or a relatively large number of pinned connections between a droop panel and a flap.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A camber adjustment system for a wing of an aircraft, the camber adjustment system comprising:
a droop panel that is configured to moveably couple to a portion of the wing;
a flap;
a cam rod moveably coupled to the droop panel;
a bell crank cam arm moveably coupled to the flap; and
a jackscrew interface between the cam rod and the bell crank cam arm, wherein the droop panel is configured to move in response to movement of the flap, via the jackscrew interface.

2. The camber adjustment system of claim 1, devoid of a dedicated droop actuator.

3. The camber adjustment system of claim 1, further comprising a flap actuator operatively coupled to the flap, wherein the flap actuator is configured to move the flap between a retracted position and a deployed position.

4. The camber adjustment system of claim 1, further comprising a coupler link that is configured to moveably couple the cam rod to the droop panel.

5. The camber adjustment system of claim 1, further comprising a link arm that moveably couples the bell crank cam arm to the flap.

6. The camber adjustment system of claim 1, wherein the jackscrew interface comprises a track on or within one of the cam rod or the bell crank cam arm that slidably retains at least one protuberance extending from the other of the cam rod or the bell crank cam arm.

7. The camber adjustment system of claim 6, wherein the track is a helical track within the bell crank cam arm, and wherein the protuberance outwardly extends from the cam rod into the helical track.

8. The camber adjustment system of claim 6, wherein the track is a helical track formed in the cam rod, and wherein the protuberance extends from a portion of the bell crank cam arm into the helical track.

9. The camber adjustment system of claim 1, wherein the jackscrew interface is configured to synchronize a desired positional relationship of the droop panel in relation to the flap over an entire range of motion of the flap and the droop panel.

10. The camber adjustment system of claim 1, wherein the droop panel comprises an upper surface connected to a lower surface, a leading edge, and a trailing edge, wherein a hinge coupling forwardly extends proximate to the leading edge, and a link coupling extends from the lower surface.

11. The camber adjustment system of claim 10, further comprising a hinge fitting, wherein the hinge coupling moveably couples the droop panel to the hinge fitting, wherein the hinge fitting comprises a bracket that moveably retains a first portion of the cam rod and a second portion of the bell crank cam arm.

12. The camber adjustment system of claim 1, wherein the cam rod moveably extends into an opening of the bell crank cam arm.

13. The camber adjustment system of claim 1, wherein the cam rod is rotationally constrained.

14. The camber adjustment system of claim 1, wherein the cam rod is configured to linearly translate via the jackscrew interface as the bell crank cam arm rotates.

15. The camber adjustment system of claim 1, wherein a distal end of the bell crank cam arm is laterally offset from a longitudinal axis of the cam rod when the flap is in a retracted position, and wherein the distal end is positioned behind the longitudinal axis of the cam rod when the flap is in a fully deployed position.

16. A camber adjustment method for a wing of an aircraft, the camber adjustment method comprising:
moveably coupling a cam rod to a droop panel that is moveably coupled to a portion of the wing;
moveably coupling a bell crank cam arm to a flap;
providing a jackscrew interface between the cam rod and the bell crank cam arm; and
moving the droop panel, in response to movement of the flap, via the jackscrew interface.

17. The camber adjustment method of claim 16, further comprising:
operatively coupling a flap actuator to the flap; and
moving the flap between a retracted position and a deployed position with the flap actuator.

18. The camber adjustment method of claim 16, wherein the moveably coupling the cam rod to the droop panel comprises moveably coupling the cam rod to the droop panel with a coupler link, and wherein the moveably coupling the bell crank cam arm to the flap comprises moveably coupling the bell crank cam arm to the flap with a link arm.

19. The camber adjustment method of claim 16, wherein the providing the jackscrew interface comprises providing a track on or within one of the cam rod or the bell crank cam arm that slidably retains at least one protuberance extending from the other of the cam rod or the bell crank cam arm.

20. An aircraft comprising:
a fuselage; and
wings outwardly extending from the fuselage, wherein each of the wings comprises a main body and a camber adjustment system connected to the main body, wherein the camber adjustment system comprises:
a droop panel that is configured to pivotally couple to a portion of the wing;
a flap;
a cam rod moveably coupled to the droop panel by a coupler link, wherein the cam rod is rotationally constrained;
a bell crank cam arm moveably coupled to the flap by a link arm;
a jackscrew interface between the cam rod and the bell crank cam arm, wherein the droop panel is configured to move in response to movement of the flap via the jackscrew interface, wherein the jackscrew interface comprises a helical track on or within one of the cam rod or the bell crank cam arm that slidably retains at least one protuberance extending from the other of the cam rod or the bell crank cam arm, the jackscrew interface being configured to maintain a desired positional relationship of the droop panel in relation to the flap over an entire range of motion of the flap and the droop panel, wherein the cam rod is configured to linearly translate via the jackscrew interface as the bell crank cam arm rotates;
a hinge fitting comprising a bracket that moveably retains a first portion of the cam rod and a second portion of the bell crank cam arm; and
a flap actuator operatively coupled to the flap, wherein the flap actuator is configured to move the flap between a retracted position and a deployed position, wherein a distal end of the bell crank cam arm is laterally offset from a longitudinal axis of the cam rod when the flap is in the retracted position, and wherein the distal end of the bell crank cam arm is positioned behind the longitudinal axis of the cam rod when the flap in the deployed position.

* * * * *